United States Patent
Effenberger et al.

(10) Patent No.: US 9,641,276 B2
(45) Date of Patent: May 2, 2017

(54) STATISTICAL OPTICAL DESIGN ENABLED VIA TWDM-PON

(71) Applicant: Futurewei Technologies, Inc., Plano, TX (US)

(72) Inventors: Frank J. Effenberger, Colts Neck, NJ (US); Lei Zong, Ellicott City, MD (US); Dekun Liu, Wuhan (CN)

(73) Assignee: Futurewei Technologies, Inc., Plano, TX (US)

(*) Notice: Subject to any disclaimer, the term of this patent is extended or adjusted under 35 U.S.C. 154(b) by 406 days.

(21) Appl. No.: 14/279,064

(22) Filed: May 15, 2014

(65) Prior Publication Data

US 2014/0341579 A1    Nov. 20, 2014

Related U.S. Application Data (60) Provisional application No. 61/824,162, filed on May 16, 2013.

(51) Int. Cl.
*H04J 14/00* (2006.01)
*H04J 14/02* (2006.01)
*H04B 10/27* (2013.01)

(52) U.S. Cl.
CPC .......... *H04J 14/0221* (2013.01); *H04B 10/27* (2013.01); *H04J 14/0283* (2013.01); *H04J 14/0247* (2013.01); *H04J 14/0252* (2013.01)

(58) Field of Classification Search
CPC ............... H04J 14/0221; H04J 14/0283; H04J 14/0247; H04J 14/0252; H04J 3/14; H04B 10/0793; H04B 10/07955; H04B 10/564; H04B 10/27; H04B 10/07953; H04Q 2011/0041

(Continued)

(56) References Cited

U.S. PATENT DOCUMENTS 7,038,843 B2 * 5/2006 Denkin .............. H04B 10/2916
                                                  359/334
7,085,496 B2 * 8/2006 Kinoshita .............. H04B 10/27
                                                  359/337

(Continued)

OTHER PUBLICATIONS

Kim, J., et al., "Optical design and analysis of CWDM upstream TWDM PON for NG-PON2," Optical Fiber Technology, Academic Press, vol. 19, No. 3, Mar. 15, 2013, pp. 250-258.

(Continued)

*Primary Examiner* — Hibret Woldekidan
(74) *Attorney, Agent, or Firm* — Conley Rose, P.C.

(57) ABSTRACT

An optical line terminal (OLT) in a time and wavelength division multiplexed (TWDM) passive optical network (PON). The OLT comprises a first optical port, a second optical port, and a processor. The first optical port is configured to couple to a plurality of optical network units (ONUs) via an optical distribution network (ODN). The second optical port is configured to couple to the ONUs via the ODN. The processor is coupled to the first optical port and the second optical port and is configured such that, responsive to receiving information indicating that the first optical port has experienced a greater power loss over time than the second optical port, the OLT assigns to the first optical port a first wavelength with a power greater than the power of a second wavelength assigned to the second optical port.

13 Claims, 5 Drawing Sheets

(58) Field of Classification Search
USPC .................. 398/68, 75, 94, 171, 197, 38
See application file for complete search history.

(56) References Cited

U.S. PATENT DOCUMENTS

| | | | | |
|---|---|---|---|---|
| 7,334,972 | B2* | 2/2008 | Cash ................ | B60P 7/083 |
| | | | | 410/100 |
| 8,145,922 | B2* | 3/2012 | Diab ................ | H04L 12/10 |
| | | | | 323/364 |
| 8,238,750 | B2* | 8/2012 | Rossetti ............ | H04J 14/02 |
| | | | | 398/67 |
| 8,995,829 | B2* | 3/2015 | Barbieri ........... | H04B 10/0793 |
| | | | | 398/25 |
| 9,319,139 | B2* | 4/2016 | Effenberger ....... | H04B 10/2581 |
| 9,425,918 | B2* | 8/2016 | Cheng ............. | H04J 14/02 |
| 2011/0033187 | A1* | 2/2011 | Rossetti ............ | H04J 14/02 |
| | | | | 398/79 |
| 2012/0328287 | A1* | 12/2012 | Grosso .............. | H04J 14/0282 |
| | | | | 398/34 |
| 2014/0341574 | A1* | 11/2014 | Yan ................. | H04Q 11/0005 |
| | | | | 398/49 |
| 2015/0318928 | A1* | 11/2015 | Yoo ................. | H04J 14/0282 |
| | | | | 398/25 |
| 2016/0309244 | A1* | 10/2016 | Ma .................. | H04Q 11/0005 |

OTHER PUBLICATIONS

Foreign Communication From a Counterpart Application, PCT Application No. PCT/US2014/038241, International Search Report dated Aug. 1, 2014, 6 pages.

Foreign Communication From a Counterpart Application, PCT Application No. PCT/US2014/038241, Written Opinion dated Aug. 1, 2014, 8 pages.

Pal, et al., "Statistical Method for ROADM Cascade Penalty," NThF2.pdf, OSA/OFC/NFOEC 2010, 3 pages.

"Series G: Transmission Systems and Media, Digital Systems and Networks—Digital Sections and Digital Line System—Optical Line Systems for Local and Access Networks—40-Gigabit-Capable Passive Optical Networks (NG-PON2): General Requirements," ITU-T Recommendation G.989.1, Mar. 2013, 26 pages.

\* cited by examiner

STATISTICAL OPTICAL DESIGN ENABLED VIA TWDM-PON

CROSS-REFERENCE TO RELATED APPLICATIONS

The present application claims priority to U.S. Provisional Patent Application No. 61/824,162 filed May 16, 2013 by Frank J. Effenberger, et al. and entitled "Statistically-Designed Passive Optical Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is a point-to-multipoint network comprising an optical line terminal (OLT) at a central office (CO), a plurality of optical network units (ONUs) at the user premises, and an optical distribution network (ODN) connecting the OLT and the ONUs. PONs may also comprise remote nodes (RNs) located between the OLTs and the ONUs, for example, at the end of a road where multiple users reside. In recent years, time division multiplexing (TDM) PONs and wavelength division multiplexing (WDM) PONs have been deployed in order to increase bandwidth. In TDM PONs, each ONU may send and receive data across every available wavelength, but only at dedicated time intervals. In WDM PONs, each ONU may send and receive data in a continuous manner, but only at dedicated wavelengths. A hybrid PON combining TDM with WDM can support higher capacity so that an increased number of users can be served by a single OLT with sufficient bandwidth per user. In such a time and wavelength division multiplexed (TWDM) PON, a WDM PON may be overlaid on top of a TDM PON. In other words, multiple wavelengths may be multiplexed together to share a single feeder fiber, and each wavelength may be shared by multiple users using TDM. However, TWDM PONs may present design and cost issues.

SUMMARY

In one embodiment, the disclosure includes a method for designing a TWDM PON. The TWDM PON comprises an OLT, a plurality of ONUs comprising a first ONU and a second ONU, and a plurality of optical paths comprising a first optical path and a second optical path, wherein each optical path extends from the OLT to one of the ONUs, and wherein the OLT comprises a plurality of optical ports comprising a first optical port and a second optical port. The method comprises designing the PON according to a statistical design power budget procedure, wherein the statistical design power budget procedure assigns to at least one component in the PON a power loss less than a specified worst-case power loss for the component; assigning the first ONU to the first optical port, wherein the first ONU is on the first optical path, wherein the first optical path has a power loss less than a mean power loss for the optical paths, and wherein the first optical port has a power loss greater than a mean power loss for the optical ports; and assigning the second ONU to the second optical port, wherein the second ONU is on the second optical path, wherein the second optical path has a power loss greater than the mean power loss for the optical paths, and wherein the second optical port has a power loss less than the mean power loss for the optical ports.

In another embodiment, the disclosure includes an OLT in a TWDM PON. The OLT comprises a first optical port, a second optical port, and a processor. The first optical port is configured to couple to a plurality of ONUs via an ODN. The second optical port is configured to couple to the ONUs via the ODN. The processor is coupled to the first optical port and the second optical port, wherein the processor is configured such that, responsive to receiving information indicating that the first optical port has experienced a greater power loss over time than the second optical port, the OLT assigns to the first optical port a first wavelength with a power greater than the power of a second wavelength assigned to the second optical port.

In another embodiment, the disclosure includes a method for upgrading a TWDM PON previously designed according to a worst-case design procedure. The method comprises redesigning the PON according to a statistical design power budget procedure, wherein the statistical design power budget procedure assigns to at least one existing component in the PON a power loss less than a specified worst-case power loss for the existing component. The method further comprises adding at least one additional ONU to the PON, wherein a power loss assigned to the additional ONU is less than or equal to the difference between the worst-case power loss for the existing component and the assigned power loss for the existing component.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present disclosure use a statistical design procedure to assign power loss levels to components in a TWDM PON that is under design or that already exists. The embodiments overcome the disadvantages of statistical design procedures by pairing components in the PON having relatively high power loss levels with components in the PON having relatively low power loss levels.

In the design or redesign of a PON, a worst-case design procedure is typically used in considering possible levels of power loss in the components in the PON, such as OLTs, ONUs, fiber cables, splitters, couplers, and similar PON components. That is, the components in any one category of such components may have a wide range of power loss values due to variations in manufacturing procedures or for other reasons. The power loss values may follow a normal distribution curve, wherein a large number of components have power loss values near the center of the curve and a much smaller number of components have power loss values in the two ends of the curve. A manufacturer of such components may publish a range of expected values for the power losses of the components, such as a mean value and a worst-case value. As an example, a splitter manufacturer may state that its splitters have a mean power loss of 18 decibels (dB) and a worst-case power loss of 20 dB. Since a PON designer may not know the exact value of the power loss for any individual component in the PON, the designer may assign an assumed power loss value to each of the components. In the worst-case design procedure, the published worst-case value is assumed to be the actual value for the power loss of each of the components in a PON.

The individual power losses for each of a plurality of connected components may be added to derive a total power loss for all of the components. If the total power loss along a path of linked components becomes too large, a signal transmitted on the path by a transmitter may become attenuated to such a degree that the signal cannot be reliably received by a receiver. In the design of a PON, it may be preferable to ensure that the total power loss on a link does not exceed such a level, which may be referred to as a loss budget or a power budget or a link budget. The use of the worst-case power loss values in the design of a PON may ensure that the PON remains highly reliable throughout its operational lifetime since the loss budget for the PON is unlikely to be exceeded in such a case.

When designing a PON, a PON designer may calculate the maximum amount of power loss that can be tolerated on a link and may set the loss budget at or below that level. The designer may then design the link such that the sum of the worst-case power losses of the components in the link does not exceed the loss budget. Even if some degradation occurs over time in the quality of the components in the link, it may safely be assumed that the power losses of the components will never exceed their respective worst-case values and that the total power loss will therefore never exceed the loss budget.

While the use of the worst-case design procedure may provide a great deal of reliability to a PON, such a procedure may create an unnecessarily large margin of error in the power loss values that are assigned to the components in the PON. Such an excessive margin of error may in turn place an unnecessarily small limit on the number of components that may be included in a link.

The use of a statistical design procedure instead of a worst-case design procedure may allow a power loss value lower than the worst-case power loss to be assigned to the components in a PON and may thus allow more components to be included in a PON than may be included under the worst-case design procedure. In the statistical design procedure, a PON designer may assume that the power losses for the components in a PON have their published mean values rather than their published worst-case values.

As an example, the loss budget for a link may be 20 dB. If all of the components in the link have a worst-case power loss value of five dB, then only four components could be included in the link under the worst-case design procedure. If all of the components in the link have a mean power loss value of four dB, and the statistical design procedure is used, then up to five components could be included in the link. As another example, if the loss budget for the ONUs in a PON is 20 dB, and if each of the ONUs proposed to be included in the PON has a worst-case power loss value of five dB, then only four ONUs could be included in the PON under the worst-case design procedure. If each of the ONUs has a mean power loss value of four dB, then up to five ONUs could be included in the PON when the statistical design procedure is used.

The actual power loss values for a set of components typically follow a normal distribution, so some percentage of the values will be higher or lower than the mean. For example, a range of two standard deviations from the mean will include 97.7% of the components, and a range of three standard deviations from the mean will include 99.8% of the components. Since some number of components may have actual power loss values greater than the mean, the use of the statistical design procedure may possibly cause the loss budget for a link to be exceeded. That is, if the number of components that can be included in a link is calculated based on the mean power loss values of the components, and if some of the components have actual power loss values greater than the mean, the total power loss in the link may be greater than the value used in the calculation of the number of components, and thus the loss budget may be exceeded. Due to the possibility of a failure of a portion of a PON in such a scenario, the statistical design procedure is typically not used in PON design, and the worst-case design procedure is typically used instead.

Embodiments of the present disclosure provide the advantages of the statistical design procedure without the drawbacks. More specifically, the higher number of components in a link possible with the statistical design procedure may be achieved, while the possibility of exceeding the loss budget is eliminated or greatly reduced. Such results may be attained from a procedure whereby components in a PON that have a power loss value greater than the mean are connected to components in the PON that have a power loss value less than the mean. The sum of the power losses of the paired components is therefore near the mean. Since multiple components with power loss values greater than the mean are not included in the same path, the total power loss across all components in a path or link is unlikely to exceed the loss budget.

In an embodiment, an ONU may be assigned to an optical port such that the sum of the power loss associated with the ONU and the power loss associated with the optical port is within a predefined range of the sum of the mean power loss for the ONUs in the PON and the mean power loss for the optical ports in the PON. Such assignments of ONUs to optical ports may continue until power losses associated with unassigned ONUs are within a predefined range of the mean power loss for the ONUs in the PON and power losses associated with unassigned optical ports are within a predefined range of the mean power loss for the optical ports in the PON.

In some embodiments, such pairing of components may comprise an end-to-end type connection wherein an ONU that is on a path in a PON known to have a power loss less than a mean power loss for paths in the PON is assigned to a port on an OLT in the PON known to have a power loss greater than a mean power loss for ports in the PON. Similarly, an ONU that is on a path in the PON known to have a power loss greater than the mean power loss for paths in the PON may be assigned to a port on the OLT known to have a power loss less than the mean power loss for ports in the PON.

In other embodiments, such high-loss-to-low-loss connections may be made between components in the path between an OLT and an ONU. That is, a PON may be divided into sections, and components in a first section that have power loss values greater than the mean may be paired with and connected to components in a second section that have power loss values less than the mean, and vice versa.

In some embodiments, such pairings of components may be made on a best-to-worst basis, wherein a first set of components are ranked in order from the lowest power loss to the highest power loss. A second set of components to which the first set of components may connect are ranked in order from the highest power loss to the lowest power loss. The first component in the first set may then be paired with the first component in the second set, the second component in the first set may be paired with the second component in the second set, and so on. Similarly, the last component in the first set may be paired with the last component in the second set, the second to last component in the first set may be paired with the second to last component in the second set, and so on.

In other embodiments, such pairings may be made on a group basis rather than a strict best-to-worst basis. That is, within a first set of components, a first group may be defined as having power loss values less than a predefined threshold, and a second group may be defined as having power loss values greater than a predefined threshold. Within a second set of components to which the first set of components may connect, a first group may be defined as having power loss values greater than a predefined threshold, and a second group may be defined as having power loss values less than a predefined threshold. Any component in the first group of the first set may then be paired with any component in the first group of the second set, and any component in the second group of the first set may be paired with any component in the second group of the second set. The thresholds may be the same for all of the groups or may be different. The thresholds may be some number of standard deviations from the mean or may be determined in some other manner.

Whether the pairings of components are made on a best-to-worst basis or a group basis, the pairing procedure may cease at a point where the remaining, unpaired components have power loss values within a predefined range of the mean. That is, the pairing procedure may pair a component in one end of a normal distribution with a component in the other end of the distribution such that the sum of the power losses of the paired components is near the mean of the distribution. When the pairing procedure has progressed to the point where all components considered to be in the ends have been paired, any of the remaining, unpaired components will be near the mean and may be connected to any of the other remaining unpaired components. A component may be considered to be in an end when the power loss of the component is some number, e.g. 3, of standard deviations away from the mean or some other predefined distance from the mean. A component may be considered to be near the mean when the power loss of the component is within such a predefined distance of the mean.

Embodiments of the present disclosure allow the pairing procedure to take advantage of features belonging specifically to time and wavelength division multiplexed PONs (TWDM PONs). An OLT in a TWDM PON has multiple transmitters and multiple receivers, each capable of operating at a different wavelength. Due to variations in manufacturing, deliberate design considerations, or other factors, an OLT may transmit signals with different power levels on different wavelengths. At least some of the ONUs in a TWDM PON are tunable to different wavelengths, and each is typically capable of receiving signals on any of the wavelengths at which the OLTs transmit. Thus, an ONU may be assigned to receive a signal on any of the channels on which an OLT is transmitting.

In an embodiment, an OLT assigns an ONU to receive a signal at a specific wavelength based on the power loss of the ONU and on the strengths of the signals transmitted by the OLT at various wavelengths. That is, if an ONU in a TWDM PON has a power loss value greater than the mean power loss of the ONUs in the TWDM PON, an OLT may assign that ONU to receive signals on a wavelength that is transmitted at a power greater than the mean power of the wavelengths at which the OLT transmits. Similarly, if an ONU in a TWDM PON has a power loss value less than the mean power loss of the ONUs in the TWDM PON, an OLT may assign that ONU to receive signals on a wavelength that is transmitted at a power less than the mean power of the wavelengths at which the OLT transmits. In this way, an above-average power loss in an ONU may be compensated for by a stronger signal from an OLT, and above-average signal strengths from OLTs are not wasted on ONUs that have below-average power losses.

The techniques described above for using the statistical design procedure while avoiding the possibility of exceeding the loss budget may be implemented in several different circumstances. Such techniques may allow a designer to design a greenfield or newly designed TWDM PON using statistical principles from the beginning of the design process. A greater number of components may thereby be included in the PON than would be the case if the worst-case design procedure were used. More specifically, when a PON is designed according to a statistical design power budget procedure, a first ONU on a first optical path that has a power loss less than the mean power loss for the optical paths in the PON may be assigned to a first optical port that has a power loss greater than the mean power loss for the optical ports in the PON, and a second ONU on a second optical path that has a power loss greater than the mean power loss for the optical paths in the PON may be assigned to a second optical port that has a power loss less than the mean power loss for the optical ports in the PON.

In a brownfield or already existing TWDM PON, an OLT may receive information indicating that one port on the OLT has experienced a greater power loss over time than another port on the OLT. Additionally or alternatively, an OLT may receive information indicating that one path to an ONU has experienced a greater power loss over time than another path to another ONU. In such cases, the OLT may reassign the wavelengths at which it is transmitting such that a wavelength with an above-average power level is assigned to the portion of the TWDM PON that has experienced the greater degradation over time. Alternatively or additionally, the OLT may reassign the wavelengths at which it is transmitting such that a wavelength with a power greater than the power of a second wavelength is assigned to the portion of the TWDM PON that has experienced the greater degradation over time. The power loss in the portion of the TWDM PON that has experienced the greater degradation may thus be compensated for by the increased power to that portion.

Such techniques may also be used to upgrade brownfield TWDM PONs. Existing TWDM PONs are likely to have been designed using the worst-case design procedure, and thus all of the components in a TWDM PON may have been presumed to have their worst-case power loss values. If at least a portion of the components are assumed to have power loss values at or near the mean values using the techniques disclosed herein, additional components may be added to the TWDM PON with little likelihood that the loss budget for the TWDM PON will be exceeded. In other words, a TWDM PON previously designed according to a worst-case design power budget procedure may be upgraded by redesigning the PON according to a statistical design power budget procedure in which at least one existing component in the PON is assigned a power loss less than a specified worst-case power loss for the existing component and by adding at least one additional component to the PON. The power loss assigned to the additional component may be less than or equal to the difference between the worst-case power loss for the existing component and the assigned power loss for the existing component.

PON protocols or standards may include asynchronous transfer mode PON (APON), broadband PON (BPON) defined by the International Telecommunication Union (ITU) Telecommunication Standardization Sector (ITU-T) G.983 standard, Gigabit PON (GPON) defined by the ITU-T G.984 standard, and Ethernet PON (EPON) defined by the Institute of Electrical and Electronics Engineers (IEEE) 802.3ah standard. Currently, GPON and EPON have been deployed worldwide for broadband services and may provide an aggregated bandwidth up to 2.5 Gigabits per second (Gb/s). To satisfy ever-increasing bandwidth demands from end users, next generation 10 Gigabit (10G) PON, sometimes known as XG-PON or 10G EPON, with an aggregated bandwidth of 10 Gb/s, has been standardized for large scale deployment. Beyond 10G PONs, future generations of optical access technologies, such as wavelength division multiplexed PON (WDM PON), time and wavelength division multiplexed PON (TWDM PON), orthogonal frequency division multiplexed (OFDM) PON and optical code division multiplexed (OCDM) PON, have been proposed and may have an aggregated bandwidth of 40 Gb/s or higher.

Among these technologies, TWDM PON has been selected by the Full Service Access Network (FSAN) community as a primary broadband solution for future access networks. TWDM PONs are described in the ITU-T G.989 standard, which is incorporated herein by reference as if reproduced in its entirety.

In TWDM PON, an optical line terminal (OLT) contains multiple transmitters (Tx) and receivers (Rx), each of which works at a different wavelength. On the downstream side, an optical networking unit (ONU) uses an optical filter to select a downstream wavelength for its Rx, and its Tx sends upstream data at a wavelength assigned by the OLT during the registration process. The optical filters and lasers in the ONUs are tunable to facilitate the flexibility of the network.

Such TWDM PON systems can provide a 40 Gb/s aggregated capacity with a splitting ratio of 1:64 and a reach of 40 kilometers (km), thereby meeting operators' requirements for future broadband services. A new set of standards on TWDM PON released by ITU-T may pave the way for future large scale deployment. With multiple wavelengths and wavelength tunability, TWDM PONs allow enhanced network functionalities unavailable in previous generations of pure TDM PONs. Incremental bandwidth upgrade and load balancing may be achieved in TWDM PON systems using tunable transmitters on an OLT line card. Energy efficient solutions in TWDM PONs have been demonstrated with dynamic wavelength routing.

TWDM PONs may face tight link power budgets due to subscriber and operator requirements. In this context, a link power budget may refer to an allocation of power among transmitters to ensure adequate received signal strength. As bandwidth-demanding services, such as high-definition television (HDTV), video-on-demand (VoD), and online gaming, increase in popularity, the increased bandwidth requirements have pushed PON technologies to evolve from megabit PONs, such as APONs and BPONs, to gigabit PONs, such as GPONs and XG-PONs. Increased bandwidth requirements may require more receiving power in both OLTs and ONUs and place stress on link power budgets. At the same time, in order to reduce cost through consolidating COs and simplifying network hierarchies, operators have required an extended network reach beyond 20 km and larger OLT-to-ONU fan-out ratios from 1:16 to 1:64 and beyond, which, in turn, may tighten the link power budget even more.

The disclosed embodiments may comprise statistically designing or redesigning a TWDM PON to optimize the network design and consequently relax the power budget requirements.

Figure 1:
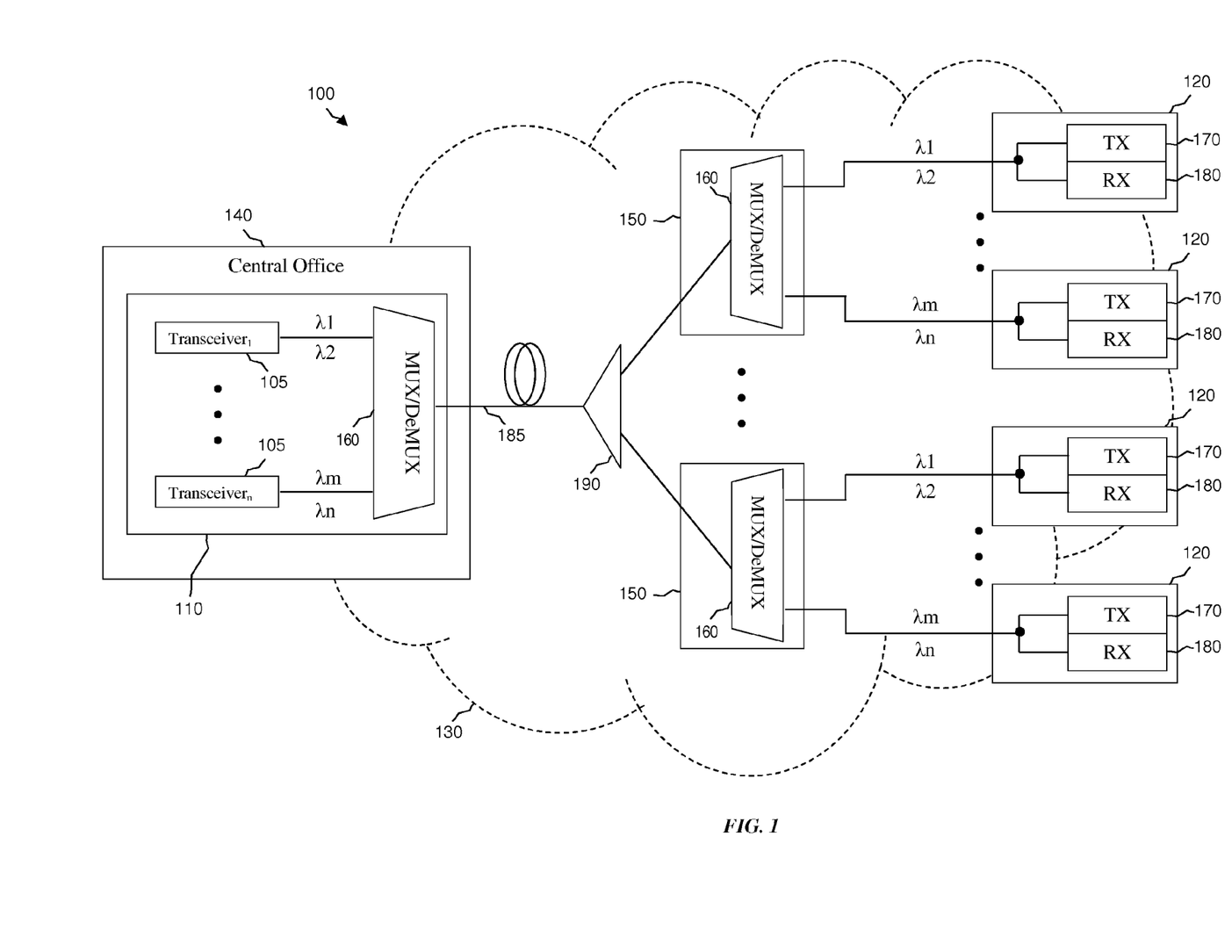
FIG. 1 is a schematic diagram of a TWDM PON according to an embodiment of the disclosure.

FIG. 1 is a schematic diagram of a PON 100. The PON 100 may comprise an OLT 110 located in a CO 140, a plurality of ONUs 120 located at the customer premises, and an ODN 130 that couples the OLTs 110 to the ONUs 120. The PON 100 may provide WDM capability by associating a downstream wavelength and an upstream wavelength with each transceiver 105 in the OLT 110 so that a plurality of wavelengths are present, combining those wavelengths into a single optical fiber cable 185, and distributing the plurality of wavelengths to a subset of the ONUs 120 through remote nodes (RNs) 150. The PON 100 may provide a time division multiple access (TDMA) capability for each subset of ONUs 120 associated with an OLT 110.

The PON 100 may be a communications network that does not require any active components to distribute data among the OLT 110, RNs 150, and ONUs 120. Instead, the PON 100 may use the passive optical components in the ODN 130 to distribute data among the OLTs 110, RNs 150, and ONUs 120. The PON 100 may be a Next Generation Access (NGA) system, such as a 10 Gb/s XG-PON, which may have a downstream bandwidth of about 10 Gb/s and an upstream bandwidth of about 2.5 Gb/s. Alternatively, the PON 100 may be any Ethernet-based network, such as an EPON defined by the IEEE 802.3ah standard, a 10 Gb EPON as defined by the IEEE 802.3av standard, an APON, a BPON defined by the ITU-T G.983 standard, a GPON defined by the ITU-T G.984 standard, or any other suitable technology, all of which are incorporated by reference as if reproduced in their entirety.

The CO 140 may be a physical building and may comprise servers and other backbone equipment (not shown) designed to service a geographical area with data transfer capability. The CO 140 may comprise a plurality of transceivers 105 and at least one multiplexer/demultiplexer (MUX/DeMUX) 160. The MUX/DeMUX 160 may be any suitable wavelength separator/combiner such as an arrayed waveguide grating (AWG). The MUX/DeMUX 160 at the CO 140 may combine the various wavelengths from the transceivers 105 into a single line to feed into the RNs 150.

The OLT 110 may be any devices configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 to the other network. Although the specific configuration of the OLT 110 may vary depending on the type of PON 100, in an embodiment, the OLT 110 may comprise a transmitter and a receiver. When the other network uses a network protocol, such as Ethernet or Synchronous Optical Networking (SONET)/Synchronous Digital Hierarchy (SDH), which differs from the PON protocol used in the PON 100, the OLT 110 may comprise a converter that converts the network protocol into the PON protocol. The OLT 110 converters may also convert the PON protocol into the network protocol. The OLT 110 may be typically located at a central location, such as the CO 140, but may be located at other locations as well.

The ODN 130 may be a data distribution system, which may comprise optical fiber cables 185, couplers, splitters, distributors, and/or other equipment. In an embodiment, the optical fiber cables 185, couplers, splitters, distributors, and/or other equipment may be passive optical components. Specifically, the optical fiber cables 185, couplers, splitters, distributors, and/or other equipment may be components that do not require any power to distribute data signals between the OLTs 110 and the ONUs 120. Alternatively, the ODN 130 may comprise one or a plurality of active components, such as optical amplifiers and/or power splitters 190. The ODN 130 may typically extend from the OLTs 110 to the ONUs 120 in a branching configuration as shown in FIG. 1, but may be alternatively configured in any other point-to-multipoint configuration.

The RNs 150 are optional and may be any component positioned within the ODN 130 that provides amplification, optical signal separation/combination, partial reflectivity, polarization rotation, and/or WDM capability. For example, the RNs 150 may comprise a MUX/DeMUX 160 or may comprise wavelength filters. The RNs 150 may exist closer to the ONUs 120 than to the CO 140, for example, at the end of a road where multiple users reside, but the RNs 150 may also exist at any point in the ODN 130 between the ONUs 120 and the CO 140.

The ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer and forward data received from the customer to the OLT 110 via the RNs 150. Although the specific configuration of the ONUs 120 may vary depending on the type of PON 100, the ONUs 120 may comprise an optical transmitter 170 (e.g., a laser) configured to send optical signals to the OLTs 110 and an optical receiver 180 configured to receive optical signals from the OLTs 110. Additionally, the ONUs 120 may comprise a converter that converts the optical signal into electrical signals for the customer, such as signals in the Ethernet or asynchronous transfer mode (ATM) protocol. The ONUs 120 may also comprise a second transmitter and/or receiver that may send the electrical signals to a customer device and/or receive the electrical signals from a customer device. In some embodiments, ONUs 120 and optical network terminals (ONTs) are similar, and thus the terms may be used interchangeably herein. The ONUs 120 may be typically located at distributed locations such as the customer premises, but may be located at other locations as well.

The ODN 130 may include several optical connectors and fiber splices between the individual elements. There may also be optical connectors between the OLT 110 and ONUs 120 and the ODN 130. The fiber 185, MUX/DeMUXs 160, and splices/connectors may all contribute to insertion loss (IL) and some degree of wavelength-dependent loss (WDL) on the link. The transmitters in both the OLT 110 and the ONUs 120 may therefore need to launch enough optical power into the network to guarantee that the receiving power is within the sensitivity range of the receivers.

Compared to the ONU side, the receiving power at the OLT side, i.e., the power of the upstream signals, may be under more pressure because it is very hard to increase the transmission power of the ONU lasers, which may be under tighter cost control and power consumption restrictions.

In PON planning and design, the IL and WDL of the passive optical components, as well as the output power of the lasers, may be key parameters to consider for link power budget planning. The specifications of most components may provide the minimum, typical, and maximum values for those parameters. In order to prevent the network from experiencing link budget problems, the worst-case method has typically been used for end-to-end loss computation. In other words, the maximum loss of all passive components and the minimum laser output power may be assumed. This method may minimize the chance of needing to redesign a network after it has been deployed, but the method may reserve too large of a margin and therefore result in very high cost of network equipment, deployment, and maintenance.

The disclosed embodiments may improve performance in greenfield (i.e., new) networks or brownfield (i.e., legacy) networks. The link budget requirements may be guaranteed in most cases (e.g., over 99% of the cases), and the chance of network failures may be eliminated by an appropriate assignment of resources. For greenfield networks, the disclosed approach may further optimize the network design based on a multi-port to multi-port loss matrix and one or more design objectives. In general, the approach may reduce the excessive link budget margin reserved in conventional designs by realistic system estimation and optimized resource assignment. More specifically, instead of using the worst-case specification data for component loss, the disclosed techniques may use the statistical distribution of the loss in the components to generate a more realistic design. Such a PON design may save several decibels (dB) in the power budget.

The IL of an optical component may vary over a wide range due to the nature of the component's design, flaws in fabrication, and/or imperfections in assembly. For example, the IL of a multi-port optical component or subsystem may show some degree of loss uniformity. Typically, 1:4 and 1:16 splitters may have loss uniformities of 0.8 dB and 2.0 dB, respectively. With a combination of two such splitters to make a 1:64 RN, the port-to-port loss variation may reach 2.8 dB in the worst case. The distribution fiber from the RN to multiple ONUs may be up to 5 km in length and may result in a fiber loss of 1.3 dB or more. In addition, there may be multiple optical connectors and fiber splice points in the network from the OLT to the ONUs. The IL of each point may vary from 0.1 dB to 0.5 dB. With six points along the network on average, the loss may vary from 0.6 dB to 3 dB.

The IL of an optical component may follow a normal distribution with a mean value of µ and standard deviation of σ. An estimate of the insertion loss value at (µ+3*σ) may cover 99.8% of all possible cases. However, the component's maximum loss, $IL_{max}$, may be greater, as shown in Equation 1.

$$IL_{max} > \mu + 3*\sigma. \quad (1)$$

For a link with N cascaded optical components, the overall link loss may still follow a normal distribution. Since the components are independent of each other, the mean and standard deviation of the link loss may be calculated based on the distribution of the individual components as shown in Equations 2 and 3.

$$\mu_{link} = \Sigma_{i=1}^{N} \mu_i \quad (2)$$

$$\sigma_{link} = \sqrt{\Sigma_{i=1}^{N} \sigma_i^2}, \quad (3)$$

where $\mu_i$ and $\sigma_i$ are the mean and standard deviation of the i-th component. Similarly, in order to cover 99.8% of the cases, a three-sigma distribution may be considered in calculating the link loss, $IL_{Link,99.8}$, as shown in Equation 4.

$$IL_{Link,99.8} = \mu_{link} + 3*\sigma_{link} = \Sigma_{i=1}^{N} \mu_i + 3* \sqrt{\Sigma_{i=1}^{N} \sigma_i^2} < \Sigma_{i=1}^{N} \mu_i + 3*\Sigma_{i=1}^{N} \sigma_i = \Sigma_{i=1}^{N} IL_{i,99.8} \quad (4)$$

where $IL_{i,99.8}$ is the insertion loss value of the i-th component that covers 99.8% of all cases.

Equation 4 shows that the link loss $IL_{link,99.8}$ is less than the sum of component loss $IL_{i,99.8}$, and with Equation 1, it is clear that with the statistical approach the link loss $IL_{link,99.8}$ would be significantly less than the sum of the component maximum loss. In an example link with three components, the mean and standard deviation of the insertion loss are listed in Table 1.

TABLE 1

Typical loss data of some PON components

| Component | Mean Loss (dB) | STD (dB) | Worst Case Loss (dB) | Component Count |
|---|---|---|---|---|
| Splitter | 18.50 | 0.30 | 20.0 | 1 |
| Connector | 0.25 | 0.05 | 0.5 | 6 |
| Drop Fiber | 2.00 | 0.20 | 3.0 | 1 |
| Total | 22 | | 26 | |

Based on the above data, the link loss calculated based on the disclosed statistical approach to cover 99.8% of the cases, $IL_{link,99.8}$ may be approximately 22 to 23 dB, while the worst-case link loss is 26 dB. Thus, at a 0.2% chance of network failure, the link power budget may be improved by about 3 to 4 dB. The savings in the power budget may be spent elsewhere, such as in increasing the yield of the integrated modules and/or reducing the cost. In the above statistical analysis, a coverage other than 99.8% may also be used. For example, for a coverage of 97.7%, 2*σ may be used in the above computation to achieve an even lower link loss, and so on.

With the above statistical design, there may be a 0.2% chance of network failure when three times the standard deviation is used in calculating the insertion loss or a 2.3% chance when two times the standard deviation is used. In an embodiment, such chances may be eliminated through optimization of network resource assignment by utilizing the wavelength-dependent nature of the network media and equipment in a TWDM PON.

TWDM PONs may use MUXs and DeMUXs to combine and separate multiple wavelengths. Most MUXs and DeMUXs may have WDL. For example, an eight-port cyclic AWG may introduce a loss uniformity of about 1.5 dB, and a MUX/DeMUX with a cascaded thin-film-filter (TFF) may have an even higher loss uniformity, especially when the port count is high. As a result of this loss uniformity, some wavelengths may be attenuated more than others.

In addition, TWDM PON terminal components may show some degree of performance variation, especially when the components work at different wavelengths. For example, an ONU may have a tunable laser in its transmitter so that the ONU can work at any available wavelength or can switch from one OLT to another OLT by tuning the wavelength of its transmitter. Such a feature may be important for flexible bandwidth allocation and power saving purposes in a TWDM PON. The tunable lasers, most likely cooled distributed feedback (DFB) lasers, may work at different chip temperatures for different wavelengths and emit different output powers accordingly. For example, when a cooled DFB laser tunes its working wavelength from 1610.1 nanometers (nm) to 1607.5 nm, testing may show that the output power increases by about 3.5 dB, which may significantly improve the receiving power of that channel.

The WDL and output power variation may be due to the nature of the component design or the physics of the component operation, so the trend may be systematic and may not change from component to component or from time to time. In some cases, the profile of WDL may be controlled in component design without changing the loss distribution. For example, in a TFF-based MUX/DeMUX the profile may be controlled by adjusting the order of the individual filters. In an embodiment, the component WDL and the wavelength-dependent output power of the tunable lasers may be exploited to improve the system performance. That is, the chance of network failure associated with the above-described statistical design technique may be eliminated through resource allocation and assignment. In particular, a wavelength with a high quality may be paired with a link with a low quality, or vice versa, in order to achieve an overall quality near the mean across the two components. For example, a link belonging to the 0.2% failed cases due to low receiving power may be assigned to a wavelength with a higher power and/or a lower WDL.

With the disclosed techniques, the relationship of laser output power versus working wavelength, as well as the WDL data of the ODN, may be sorted and stored in a look-up-table (LUT). When an ONU becomes active and starts to register with the OLT, the OLT may check its LUT with the ONU ID and determine what wavelength to assign to the ONU based on a predefined algorithm. For example, an algorithm may assign the wavelength of the highest power to the ONU with the lowest margin, and so on, until the capacity of that wavelength has reached its limit.

In a greenfield network where everything from the ODN to the terminal equipment is not yet determined, the network design may be optimized by reducing the standard deviation of the IL distribution and thus further relaxing the power budget and reducing the chance of network failure.

Figure 2:
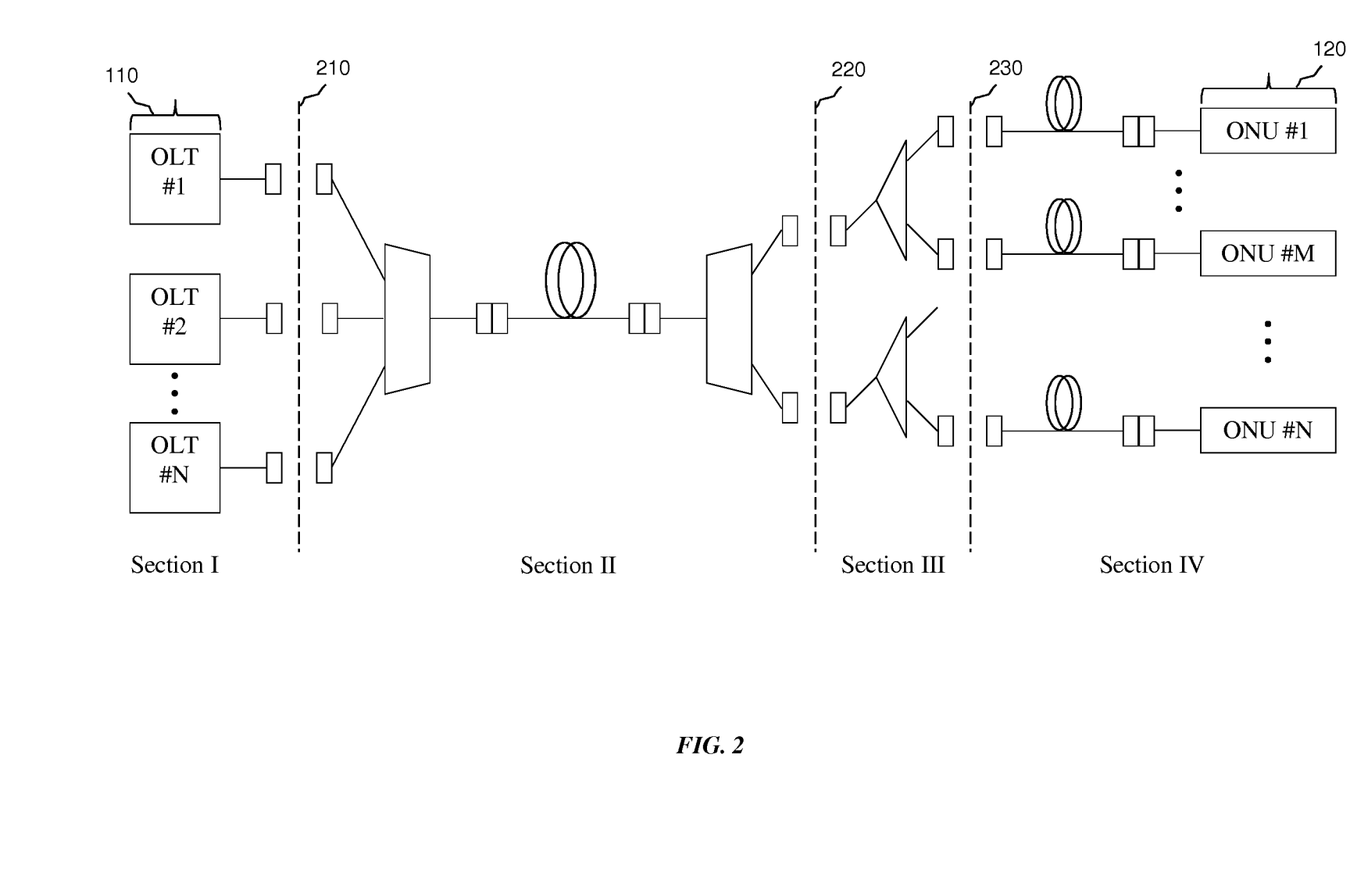
FIG. 2 is another schematic diagram of a TWDM PON according to an embodiment of the disclosure.

In an embodiment, a PON may be divided into s sections for processing. For example, the PON in FIG. 2 is divided into four sections with a first separation point 210 at the OLTs 110, a second separation point 220 at the RNs (between the DeMUX/splitter stages), and a third separation point 230 between the RNs and the distribution fibers. A general rule may be to separate the network so that every section has multiple input ports and output ports. The IL of each section may be obtained from either a device specification sheet or from measurement, and s matrices may be obtained for IL from any input port to any output port in each section, as shown in the following matrix.

$$\begin{bmatrix} IL_{k,1,1} & IL_{k,1,2} & \dots & IL_{k,1,N} \\ IL_{k,2,1} & IL_{k,2,2} & \dots & IL_{k,2,n} \\ \dots & \dots & \dots & \dots \\ IL_{k,M,1} & IL_{k,M,2} & \dots & IL_{k,M,N} \end{bmatrix}$$

In the above matrix, element $IL_{k,i,j}$ may represent the insertion loss from input port i to output j in the k-th section. Each row may comprise the loss data from one input port to all the output ports in that section, and similarly each column may comprise the loss data from all input ports to one output port. With the IL matrices, the input ports of section k+1 may be paired to the output ports of section k based on a preset objective of the design. The objective may vary from design to design.

A first objective may be to minimize the standard deviation of the end-to-end loss distribution with the constraint that each output port of a section can only be connected to one input port of the next section. This objective may result in a network design plan with a small loss delta by connecting a high-loss path in one section to a low-loss path in another section so that the overall losses of all end-to-end links may be close to each other. In other words, the end-to-end loss, $IL_{e2e}$, may be approximately the average of the maximum and minimum of the end-to-end loss, as shown in Equation 5.

$$IL_{e2e} \approx (IL_{max,e2e} + IL_{min,e2e})/2 \quad (5)$$

Compared to the conventional way of using only the maximum loss, this technique may improve the power budget by about $(IL_{max,e2e} - IL_{min,e2e})/2$, which may be in the range of several dB.

A second objective may be to differentiate the subscribers by giving a link with a loss margin of several dB to premium subscribers while providing the best effort to the other subscribers. In this case, after the first several links are established, the rest may be created in the same way as described above.

Figure 3A:
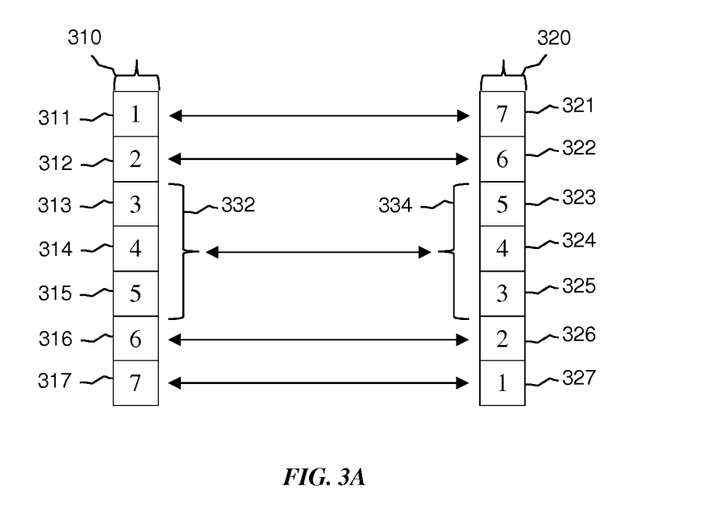
FIG. 3A illustrates a technique for pairing components with low power loss values to components with high power loss values according to an embodiment of the disclosure.

FIG. 3A illustrates a technique for pairing components with low power loss values to components with high power loss values using a best-to-worst procedure. In this embodiment, a first set 310 of components in a TWDM PON are ranked from the component 311 with the least power loss to the component 317 with the most power loss. A second set 320 of components in the TWDM PON are ranked from the component 321 with the most power loss to the component 327 with the least power loss. The components may be OLTs, ONUs, fiber cables, splitters, couplers, or other similar PON components. While seven components are shown in each set, other numbers of components may be present. In an embodiment, the component 311 with the least power loss in the first set 310 is paired for connection in the TWDM PON with the component 321 with the most power loss in the second set 320, and the component 312 with the second least power loss in the first set 310 is paired for connection in the TWDM PON with the component 322 with the second most power loss in the second set 320. Similarly, the component 317 with the most power loss in the first set 310 is paired for connection in the TWDM PON with the component 327 with the least power loss in the second set 320, and the component 316 with the second most power loss in the first set 310 is paired for connection in the TWDM PON with the component 326 with the second least power loss in the second set 320.

In this example, it is assumed that after these four pairings are complete, the remaining components have power loss values near enough to the mean that additional such pairings are not necessary. Thus, any of the components in a first middle group 332 of components in the first set 310 may be paired for connection in the TWDM PON with any of the components in a second middle group 334 of components in the second set 320. In other embodiments, other numbers of best-to-worst type pairings may be made, and thus other numbers of components maybe present in the first middle group 332 and the middle second group 334.

Figure 3B:
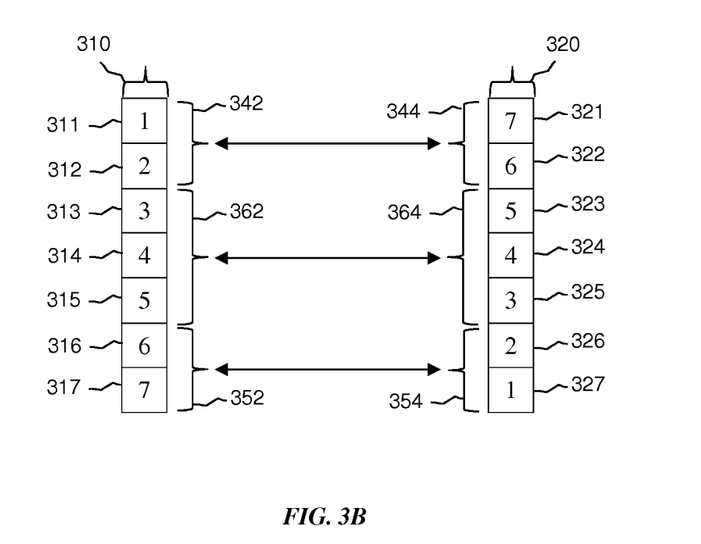
FIG. 3B illustrates another technique for pairing components with low power loss values to components with high power loss values according to an embodiment of the disclosure.

FIG. 3B illustrates a technique for pairing components with low power loss values to components with high power loss values using a grouping procedure. The rankings and other parameters that applied to the two sets of components in FIG. 3A may apply as well to FIG. 3B. In this example, however, rather than the components being paired on a strict one-to-one basis, any of the components in a group within the first set 310 may be paired with any of the components in a corresponding group within the second set 320. In this case, the two components 311 and 312 with least power loss in the first set 310 form a first group 342, the two components 316 and 317 with most power loss in the first set 310 form a second group 352, and the remaining components 313, 314, and 315 form a third group 362. Similarly, the two components 321 and 322 with most power loss in the second set 320 form a first group 344, the two components 326 and 327 with least power loss in the second set 320 form a second group 354, and the remaining components 323, 324, and 325 form a third group 364. In an embodiment, any of the components in the first group 342 in the first set 310 may be paired with any of the components in the first group 344 in the second set 320, any of the components in the second group 352 in the first set 310 may be paired with any of the components in the second group 354 in the second set 320, and any of the components in the third group 362 in the first set 310 may be paired with any of the components in the third group 364 in the second set 320.

Figure 4:
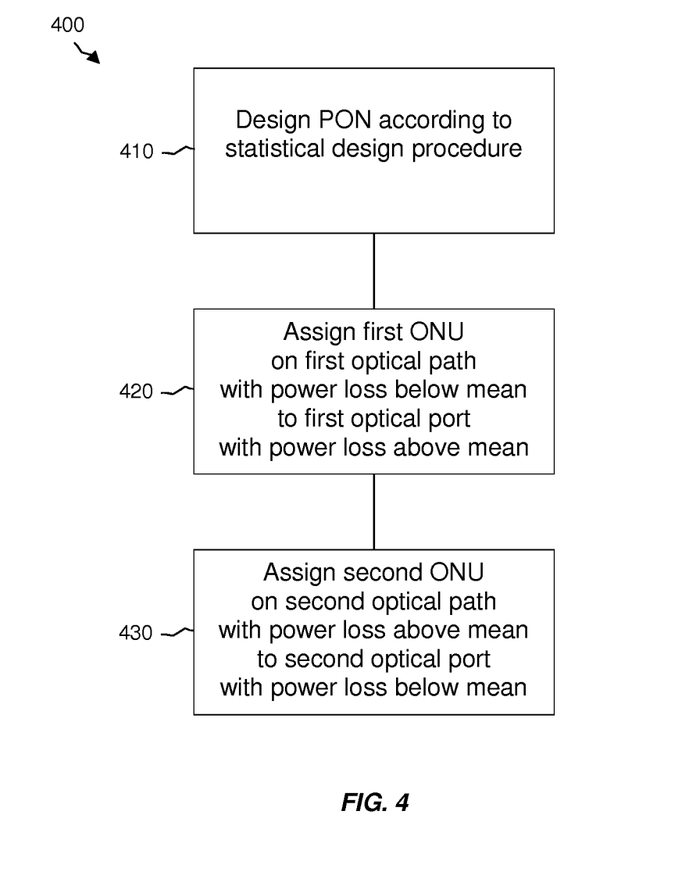
FIG. 4 is a flowchart illustrating a method for designing a TWDM PON according to an embodiment of the disclosure.

FIG. 4 illustrates an embodiment of a method 400 for designing a TWDM PON. At block 410, the PON is designed according to a statistical design power budget procedure. The statistical design power budget procedure assigns to at least one component in the PON a power loss less than a specified worst-case power loss for the component. At block 420, a first ONU is assigned to a first optical port. The first ONU is on a first optical path that has a power loss less than a mean power loss for the optical paths in the PON. The first optical port has a power loss greater than a mean power loss for the optical ports in the PON. At block 430, a second ONU is assigned to a second optical port. The second ONU is on a second optical path that has a power loss greater than the mean power loss for the optical paths. The second optical port has a power loss less than the mean power loss for the optical ports.

In short, the disclosed techniques may be employed to relax the requirement for the receiving power by using the distribution of the components' IL specifications. To reduce or eliminate the small chance of network failure in the design, wavelength-dependent parameters, such as WDL and transmitter power variation at different wavelengths, may be used in network planning and operation to assign good channels to bad links or vice versa. For greenfield ODN design, a section pairing approach may be used to optimize the network connections to satisfy various design objectives and reduce the standard deviation of the IL distribution of the network and thereby further improve the network link budget.

The disclosed techniques address the tight link power budget in PONs. This budget limits the reach of the network, the fan-out (i.e., the number of users who can be supported), and the data rate that can be supported in the network. The disclosed techniques may improve the link power budget through a novel way of network design using two aspects. The first aspect may be to estimate the link budget based on the distribution statistics of the components and to eliminate the small chance of network failure by exploiting the wavelength-dependent features of the components through wavelength/port assignment in TWDM PONs. The second aspect may be to optimize the design of the ODN by analyzing the IL matrices of multiple network sections and, by pairing the sectional paths, to achieve a low standard deviation in the link loss distribution.

The disclosed techniques may calculate the link loss distribution based on the individual component statistics. The techniques may estimate the link budget from the mean loss and standard deviation and eliminate the small chance of network failure by optimization of the resource assignment. Existing approaches design ODNs by estimating the link budget based on the worst-case specifications of the components (i.e., by taking the sum of the maximum loss of all components as the link loss). The disclosed techniques may relax the requirements for link power budget by removing the excessive power budget margin reserved by existing approaches. The savings in the power budget may be applied to improve the entire network or may be used to increase the yield of the integrated modules to reduce cost.

Figure 5:
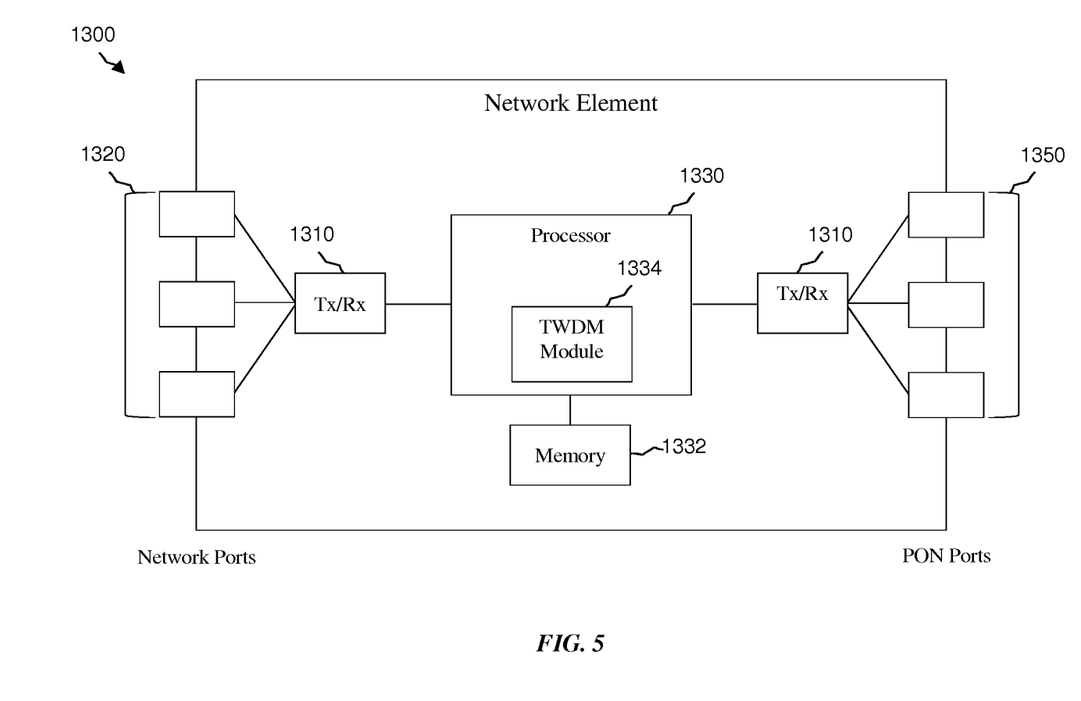
FIG. 5 is a schematic diagram of a network element according to an embodiment of the disclosure.

FIG. 5 is a schematic diagram of an embodiment of a network element (NE) 1300 within a PON, such as an OLT or an ONU. The NE 1300 may be suitable for implementing one or more embodiments of systems, methods, and schemes disclosed herein. The NE 1300 may be configured to transmit and/or receive TWDM-based transmissions over a multi-mode fiber. NE 1300 may be implemented in a single node, or the functionality of the NE 1300 may be implemented in a plurality of nodes. One skilled in the art will recognize that the term NE encompasses a broad range of devices of which NE 1300 is merely an example. NE 1300 is included for purposes of clarity of discussion, but is in no way meant to limit the application of the present disclosure to a particular NE embodiment or class of NE embodiments. At least some of the features and methods described in the disclosure may be implemented in a network apparatus or component such as an NE 1300. For instance, the features/methods in the disclosure may be implemented using hardware, firmware, and/or software installed to run on hardware.

As shown in the figure, the NE 1300 may comprise transceivers (Tx/Rx) 1310, which may be transmitters, receivers, or combinations thereof. A Tx/Rx 1310 may be coupled to a plurality of network ports 1320 (e.g., SONET/SDH or Ethernet interfaces) for transmitting and/or receiving frames from a backbone or provider network. A Tx/Rx 1310 may also be coupled to a plurality of PON ports 1350 (e.g., in the case of an OLT, interfaces coupled to ONUs) for transmitting and/or receiving frames from other nodes. A processor 1330 may be coupled to the Tx/Rxs 1310 to process the frames and/or determine which nodes to send frames to. The processor 1330 may comprise one or more multi-core processors and/or memory devices 1332, which may function as data stores, buffers, etc. Processor 1330 may be implemented as a general processor or may be part of one or more application specific integrated circuits (ASICs) and/or digital signal processors (DSPs). Processor 1330 may comprise a TWDM module 1334, which may implement the methods discussed herein. In an alternative embodiment, the TWDM module 1334 may be implemented as instructions stored in the memory 1332, which may be executed by the processor 1330, or may be implemented in part in the processor 1330 and in part in the memory 1332. In another alternative embodiment, the TWDM module 1334 may be implemented on separate NEs. The downstream ports 1320 and/or upstream ports 1350 may contain electrical and/or optical transmitting and/or receiving components.

It is understood that by programming and/or loading executable instructions onto the NE 1300, at least one of the processor 1330, TWDM module 1334, Tx/Rxs 1310, memory 1332, downstream ports 1320, and/or upstream ports 1350 are changed, transforming the NE 1300 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose central processing unit (CPU) inside a computer system) in a computer system (e.g., an OLT or an ONU) to execute a computer program. In this case, a computer program product can be provided to a computer or a mobile device using any type of non-transitory computer readable media. The computer program product may be stored in a non-transitory computer readable medium in the computer or the network device. Non-transitory computer readable media may include any type of tangible storage media. Examples of non-transitory computer readable media include magnetic storage media (such as floppy disks, magnetic tapes, hard disk drives, etc.), optical magnetic storage media (such as magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM, flash ROM, and random access memory (RAM)). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires or optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for designing a time and wavelength division multiplexed (TWDM) passive optical network (PON) comprising an optical line terminal (OLT), a plurality of optical network units (ONUs) comprising a first ONU and a second ONU, and a plurality of optical paths comprising a first optical path and a second optical path, wherein each optical path extends from the OLT to one of the ONUs, and wherein the OLT comprises a plurality of optical ports comprising a first optical port and a second optical port, the method comprising:

designing the PON according to a statistical design power budget procedure, wherein the statistical design power budget procedure assigns to at least one component in the PON a power loss less than a specified worst-case power loss for the component;

assigning the first ONU to the first optical port, wherein the first ONU is on the first optical path, wherein the first optical path has a power loss less than a mean power loss for the optical paths, and wherein the first optical port has a power loss greater than a mean power loss for the optical ports; and assigning the second ONU to the second optical port, wherein the second ONU is on the second optical path, wherein the second optical path has a power loss greater than the mean power loss for the optical paths, and wherein the second optical port has a power loss less than the mean power loss for the optical ports.

2. The method of claim 1, wherein an assignment of one of the ONUs to one of the optical ports is performed such that a sum of a power loss associated with the one of the ONUs and a power loss associated with the one of the optical ports is within a predefined range of the sum of the mean power loss for the ONUs and the mean power loss for the optical ports.

3. The method of claim 2, wherein an assignment of at least one available ONU to a worst available optical port continues until power losses associated with unassigned ONUs are within a predefined range of the mean power loss for the plurality of ONUs and power losses associated with unassigned optical ports are within a predefined range of the mean power loss for the plurality of optical ports.

4. The method of claim 1, wherein an ONU with a lowest power loss is assigned to an optical port with a highest power loss, and wherein the ONU with the highest power loss is assigned to the optical port with the lowest power loss.

5. The method of claim 1, wherein any ONU in a group of ONUs defined to have low power losses is assigned to any optical port in a group of optical ports defined to have high power losses, and wherein any ONU in a group of ONUs defined to have high power losses is assigned to any optical port in a group of optical ports defined to have low power losses.

6. The method of claim 1, wherein wavelengths are assigned to ONUs such that a wavelength with a power greater than a mean power for wavelengths in the PON is assigned to the one of the ONUs with the power loss greater than the mean power loss for ONUs in the PON and such that the wavelength with a power less than a mean power for wavelengths in the PON is assigned to the one of the ONUs with the power loss less than the mean power loss for the ONUs in the PON.

7. The method of claim 1, further comprising:
dividing the PON into a plurality of sections; and
connecting an optical path with a power loss greater than the mean power loss for the optical paths in the PON in a first section to the optical path with a power loss less than the mean power loss for the optical paths in the PON in a second section.

8. An optical line terminal (OLT) in a time and wavelength division multiplexed (TWDM) passive optical network (PON), the OLT comprising:
a first optical port configured to couple to a plurality of optical network units (ONUs) via an optical distribution network (ODN);
a second optical port configured to couple to the ONUs via the ODN; and
a processor coupled to the first optical port and the second optical port, wherein the processor is configured to:
assign a first wavelength to the first optical port, with a first wavelength power greater than a second wavelength power of a second wavelength assigned to the second optical port, with the first wavelength being assigned to the first optical port in response to the first optical port having a greater power loss over time than the second optical port;
assign a first ONU on a first optical path to the first optical port that has a first optical port power loss greater than a port mean power loss for optical ports in the PON, with the first optical path having a first optical path power loss less than a path mean power loss for optical paths in the PON; and
assign a second ONU on a second optical path to the second optical port that has a second optical port power loss less than the port mean power loss, with the second optical path having a second optical path power loss greater than the path mean power loss,
wherein at least one component in the PON designed according to a statistical design power budget procedure is assigned to a power loss less than a specified worst-case power loss for the component.

9. The OLT of claim 8, wherein an assignment of one of the ONUs to one of the optical ports has been performed such that a sum of a power loss associated with the one of the ONUs and a power loss associated with the one of the optical ports is within a predefined range of the sum of the mean power loss for the ONUs in the PON and the mean power loss for the optical ports in the PON.

10. The OLT of claim 9, wherein an assignment of ONUs to the optical ports continued until power losses associated with unassigned ONUs were within a predefined range of the mean power loss for the ONUs in the PON and power losses associated with unassigned optical ports were within a predefined range of the mean power loss for the optical ports in the PON.

11. The OLT of claim 8, wherein an ONU with a lowest power loss has been assigned to an optical port with a highest power loss, and wherein the ONU with the highest power loss has been assigned to the optical port with the lowest power loss.

12. The OLT of claim 8, wherein any ONU in a group of ONUs defined to have low power losses has been assigned to any optical port in a group of optical ports defined to have high power losses, and wherein any ONU in a group of ONUs defined to have high power losses has been assigned to any optical port in a group of optical ports defined to have low power losses.

13. The OLT of claim 8, wherein the PON has been divided into a plurality of sections, and wherein the second optical path with the power loss greater than the mean power loss for the optical paths in the PON in a first section has been connected to the first optical path with the power loss less than the mean power loss for the optical paths in the PON in a second section.

* * * * *